United States Patent [19]

Connolly, Jr. et al.

[11] Patent Number: 4,522,769
[45] Date of Patent: Jun. 11, 1985

[54] METHOD FOR THE MANUFACTURE OF NUCLEAR FUEL PRODUCTS

[75] Inventors: John D. Connolly, Jr.; Timothy J. Gallivan, both of Wilmington; Richard P. Ringle, Scotts Hill, all of N.C.

[73] Assignee: General Electric Company, San Jose, Calif.

[21] Appl. No.: 410,977

[22] Filed: Aug. 24, 1982

[51] Int. Cl.³ .............................................. G21C 21/00
[52] U.S. Cl. ...................................... 264/0.5; 252/637; 252/639; 423/261
[58] Field of Search ................. 264/0.5; 252/628, 629, 252/635, 639, 632, 643, 638, 637; 423/260, 261

[56] References Cited

U.S. PATENT DOCUMENTS

| 3,806,565 | 4/1974 | Langrod | 264/0.5 |
|---|---|---|---|
| 3,912,798 | 10/1975 | Rachor et al. | 264/0.5 |
| 3,953,286 | 4/1976 | Watson et al. | 264/0.5 |
| 3,995,000 | 11/1976 | Butler et al. | 264/0.5 |
| 4,061,700 | 12/1977 | Gallivan | 264/0.5 |
| 4,138,360 | 2/1979 | Gallivan | 264/0.5 |
| 4,284,593 | 8/1981 | Sutcliffe et al. | 264/0.5 |
| 4,293,507 | 10/1981 | Sutcliffe et al. | 264/0.5 |
| 4,363,757 | 12/1982 | Köster et al. | 264/0.5 |
| 4,383,953 | 5/1983 | Larson et al. | 264/0.5 |
| 4,389,341 | 6/1983 | Gaines, Jr. et al. | 264/0.5 |
| 4,427,579 | 1/1984 | Gaines, Jr. et al. | 423/9 |
| 4,432,915 | 2/1984 | Gallivan | 264/0.5 |

FOREIGN PATENT DOCUMENTS

| 1536677 | 7/1968 | France | 264/0.5 |
|---|---|---|---|
| 112496 | 9/1979 | Japan | 264/0.5 |
| 117995 | 9/1980 | Japan | 264/0.5 |
| 1461263 | 1/1976 | United Kingdom | 264/0.5 |
| 2067536 | 7/1981 | United Kingdom | 264/0.5 |

Primary Examiner—Ben R. Padgett
Assistant Examiner—Howard J. Locker
Attorney, Agent, or Firm—Ivor J. James, Jr.; Samuel E. Turner; Raymond G. Simkins

[57] ABSTRACT

An improved method for compression molding typically brittle, particulate ceramic materials comprising uranium dioxide in the manufacture of nuclear fuel products.

13 Claims, 1 Drawing Figure

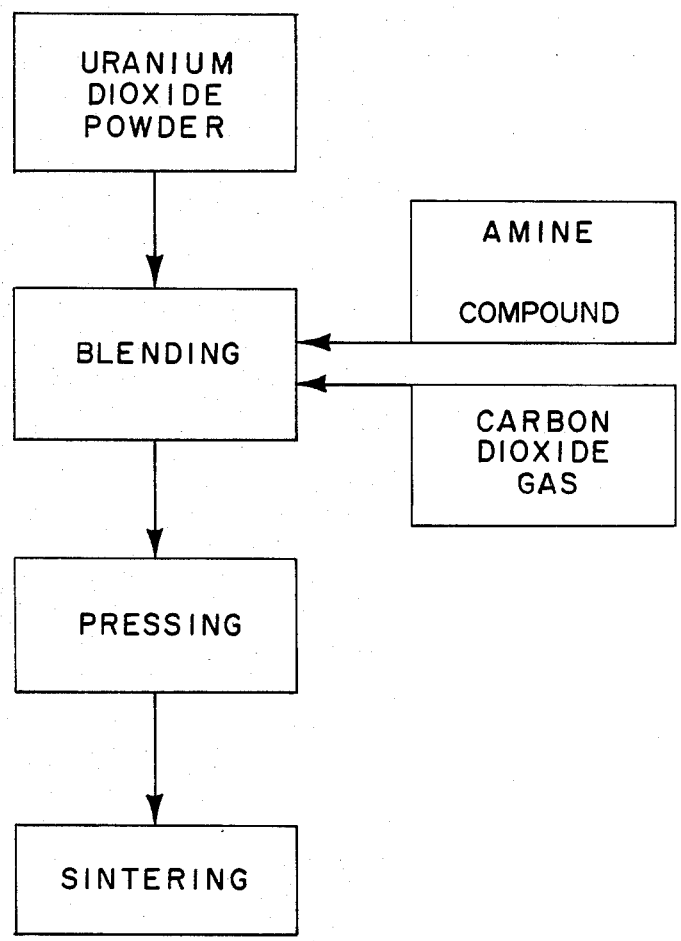

METHOD FOR THE MANUFACTURE OF NUCLEAR FUEL PRODUCTS

FIELD OF THE INVENTION

This invention relates generally to the ceramic art and the formation of sintered bodies from particulate oxide materials. It is particularly concerned with a process for producing consolidated units of particulate ceramic materials including the compressing of such particles into coherent and handleable compacts for subsequent sintering to integrated bodies. The invention is specifically directed to the manufacture of nuclear fuel products from particulate materials containing uranium dioxide.

CROSS-REFERENCE

This invention is related to that disclosed and claimed in U.S. patent application Ser. No. 331,492 filed Dec. 17, 1981, in the names of George L. Gaines, Jr., Patricia A. Piacente, William J. Ward III, Peter C. Smith, Timothy J. Gallivan, and Harry M. Laska; and to Ser. No. 273,900 filed June 15, 1981, in the names of George L. Gaines, Jr. and William J. Ward III, now U.S. Pat. No. 4,389,341. Both of said applications are assigned to the same assignee as this application, and are incorporated herein by reference.

BACKGROUND OF THE INVENTION

Fissionable nuclear fuel for nuclear reactors comprises a variety of compositions and forms of fissionable materials, including ceramic compounds of uranium, plutonium and thorium. Fuel compounds for commercial power generating reactors typically comprise oxides of uranium, plutonium and thorium, and mixtures thereof. The generally most suitable and commonly used fuel for such commercial nuclear reactors is uranium dioxide, which can be combined with minor amounts of other fuel materials including neutron flux controlling additives such as gadolinium.

Commercially produced uranium dioxide is a fine, fairly porous powder, a form which is not suitable as such for use as fuel in commercial reactors. A number of means have been developed and used to convert powdered uranium dioxide into a form suitable for use as a fuel for in power generating nuclear reactors. One commonly used technique has been to sinter appropriately sized bodies of the powdered uranium dioxide material at high termperatures to develop strong diffusion bonds between the individual powder particles.

However, the sintering technique requires a preliminary forming of the loose powder into a shaped, and self-retaining, body of particles of sufficient strength and integrity to survive handling and the sintering procedure. The operation of consolidating fine particles into a body or coherent compact with acceptable low levels of rejects, and the strength and uniformity for enduring subsequent handling and firing has been a subject of considerable concern and investigation in the nuclear fuel industry.

Conventional organic or plastic binders commonly used in powder fabrication have been considered to be unsuitable in nuclear fuel processing operations. Entrainment of any binder residues such as carbon within the sintered nuclear fuel product is unacceptable in reactor service. Moreover, the presence of any organic binder among the particles inhibits the formation during sintering of strong diffusion bonds between the particles, and adversely affects the density of the sintered product. The complete removal of binders, or their decomposition products, prior to sintering is especially difficult, and usually requires a costly additional operation in the fuel manufacture.

Accordingly, a common method has been to die press uranium dioxide powder into appropriately sized "green" (unfired) compacts without the assistance of any binder. This approach however has resulted in very costly high rates of rejects and scrap material recycling because of the weakness of green, binder-free compacts of powder.

U.S. Pat. No. 4,061,700, issued Dec. 6, 1977, to Gallivan, and assigned to the same assignee as this application, discloses a distinctive group of fugitive binders that improved the production of sintered pellets of particulate nuclear fuel materials for nuclear reactors. The fugitive binders of this patent function without contaminating the resulting fuel products, and they permit the formation of strong bonds between sintered particles during firing without deleteriously affecting the desired porosity of the sintered pellet.

The disclosure of the said U.S. Pat. No. 4,061,700 and of U.S. Pat. Nos. 3,803,273; 3,923,933; and 3,927,154, also assigned to the same assignee as the instant application, and relating to significant aspects in the subject field of producing nuclear fuel pellets from particulate fissionable ceramic material for reactor service, are all incorporated hereby by reference.

The prior art techniques or means such as disclosed in U.S. Pat. No. 4,061,700, have been found wanting in some conditions and circumstances. For instance it has been observed that the fugitive binders of the aforesaid patent do not provide consistent results as to pellet strength and integrity irrespective of the blending conditions and particle characteristics of the uranium dioxide powder. Specifically the severity of agitation in blending, relative humidity and temperature, and duration of storage, as well as the uranium oxide powder properties such as size, surface area and moisture content are all factors that apparently can detract from the uniformity of the physical attributes provided by such fugitive binders.

The amine-type of fugitive binder of the aforesaid applications Ser. Nos. 331,492 and 273,900 have been found to provide significant improvements in the processing characteristic of particulate ceramic materials comprising uranium dioxide and in the physical properties of compacts formed therefrom.

Nevertheless, the foregoing prior art measures have not sufficiently overcome the inherent brittle nature of some ceramic materials comprising uranium dioxide powder and imparted therein a degree of plasticity to enable their consistent and rapid consolidation to coherent compacts having high resistance to fracture.

This invention deals with the typical brittle nature of ceramic materials and problems imposed thereby when compression molding such in materials in particulate form and also occurring in the resulting molded product. As is well known, ceramic materials are generally of a relatively brittle consistency as opposed to a plastic conformable consistency. Thus, rather than gradually deforming over a period of progressively increasing applied compressive stress approaching the breaking point as is the case with a plastic material, ceramics tend to rigidly resist substantially all deformation until the breaking point is reached whereupon they abruptly fracture with the resulting fissure or fissures instantly progressing through the mass fragmenting it. An apt illustration of this brittle and unyielding property and the facture characteristics of a ceramic is the crushing of a glass marble. On the other hand, a plastic material will gradually yield and deform with progressively increasing compressive stress until reaching its breaking point and rupturing, and commonly the propagation of the resulting fracture is of a slower rate and does not continue to the extent of fragmenting the mass. Thus, a plastic type of material is more amenable to compression molding than the brittle type of materials.

This inherent brittle characteristic in uranium dioxide powder, or its lack of plasticity, constitutes a significant shortcoming in compression molding operations and in the properties of the molded products.

SUMMARY OF THE INVENTION

This invention comprises a method of producing coherent compacts from particulate ceramic material wherein the ceramic material is rendered more plastic, or less brittle, while undergoing compression molding by providing a novel binder system including a multifunctional primary amine with carbon dioxide gas. Thus the invention entails a process comprising a combination of operations acting upon the specified ingredients, including the essential provision of carbon dioxide gas for the amine compound contained in the particulate ceramic nuclear fuel material.

OBJECTS OF THE INVENTION

It is a primary object of this invention to provide an improved method for rendering particulate ceramic material more amenable to compression molding.

It is another object of this invention to provide means for overcoming the brittle nature of ceramic particles and to impart plasticity to such a material whereby it can be compression molded under essentially all compacting conditions and at high rates with a lower level of rejects.

A further object of this invention is to provide a method for improving the compression molding of particulate ceramic materials comprising uranium dioxide powder into coherent compacts and increasing the resistance of such compacts of ceramic materials to fracture and fissure propagation during compression molding and thereafter, including the sintered products of the molded material.

A still further object of this invention is to provide a method of producing nuclear fuel pellets comprising uranium dioxide from particulate ceramic material wherein the particulate ceramic is compression molded to a coherent compact at fast rates with minimal rejects due to fractures in either the unfired coherent compact or in its sintered product.

DESCRIPTION OF THE DRAWING

The drawing comprises a flow sheet diagram illustrating the steps of the method of this invention.

DETAILED DESCRIPTION OF THE INVENTION

This invention comprises an improved method for producing a fissionable nuclear fuel product in pellet form from particulate ceramic material utilizing a fugitive binder which is subsequently removed during the sintering operation. The method includes the process of compression molding of particulate ceramic material comprising uranium dioxide powder combined with a fugitive binder comprising a multifunctional primary amine with carbon dioxide gas to form coherent compacts of apt dimensions, and thereafter sintering the compacts to produce integrated bodies of fissionable nuclear fuel suitable for use in nuclear reactors.

The particulate fissionable nuclear fuel materials for use in this invention comprise various materials used as nuclear fuels for nuclear reactors, including ceramic compounds such as oxides of uranium, plutonium and thorium. Preferred fuel compounds consist of uranium oxide, plutonium oxide, thorium oxide, and mixtures thereof.

The particulate nuclear fuel material in the practice of the invention can also include various additives such as neutron absorbing materials comprising gadolinium to moderate neutron flux densities.

Fugitive binders suitable for use in the practice of this invention comprise the amines disclosed and claimed in the above identified applications for patent Ser. Nos. 331,492 and 273,900. These include multifunctional primary amines selected from the group consisting of ethylene diamine; 3.3 diaminodipropylamine; 1.3 diaminopropane; 1.6 diaminohexane; 1.7 diaminoheptane; diethylenetriamine; and 3-dimethylaminopropylamine. Such binder agent are preferable employed in amounts of from about 0.3% to about 4% by weight of the amine compound based upon the weight of the nuclear fuel material. Amounts of amine beyond about 4% do not generally provide a proportionally commenserate benefit in bonding capacity, and may introduce unwanted effects which can compromise any advantages or the costs of including greater amounts of the bonding agent.

In accordance with the method of this invention, the amine is added to the particulate ceramic fuel material containing uranium dioxide and the binder blended substantially uniformly through the particulate material. Then carbon dioxide gas is passed through the prepared blend of particulate material containing the amine in an amount of gas of at least about one mole of carbon dioxide gas for each gram mole of $NH_2$ in the amine. Thereafter, the blend of particulate ceramic material and added amine-containing binder with the carbon dioxide gas is compressed into a coherent compact of suitable dimensions in accordance with procedures and means of the art. The method of this invention enables the effective use of such blends in high speed, continuous production rotary press devices and operations.

The "green" (unfired) coherent compacts thus formed are then sintered in accordance with the practices and procedures of the art to expel binder material and integrate the ceramic particles into a uniform and continuous body. The sintered product, typically in the form of a pellet, is thereafter ground to specified dimensions for its designated service.

Blending of the added amine can be effected with any appropriate "dry" mixing apparatus including low shear blenders such as fluidized bed, slab and ribbon blenders, and high shear or intensive blenders such as vibratory mills, ball mills and centrifugal mills.

The blending of the particulate material with the amine, and thereafter the introduction of the carbon dioxide gas, should include a dwell time of at least about 20 minutes and preferable at least about 40 minutes. This dwell period provides for the amine-containing binder with the gas to react directly with the uranium dioxide producing an effective bonding mechanism, and also the modification of the brittle mixture of ceramic particles to render them more plastic and amenable in compression molding.

Upon applying the amine and carbon dioxide gas of this invention to the particulate ceramic material, the blend thereof can be compression molded into coherent compacts or handleable pellets by substantially any effective means or device in accordance with the technology of this field such as is described in the prior art, including the above cited patents and pending applications.

The coherent compacts or pellets of the compression molded, binder containing particulate ceramic material are then sintered to expel binder material therefrom and integrate the ceramic particles into an essentially continuous body or mass of substantially uniform consistency, and relatively high strength and good resistance to fracture. Water or other suitable solvent may be added to the amine prior to its addition to the particulate ceramic fuel material containing uranium dioxide to reduce the corrosive effect of the amine upon certain materials such as rubber lining which may be present in processing equipment. When water is included, its content in the blend must be adjusted to a final amount of below about 5000 parts per million by weight.

Examples of preferred procedures for the practice of the method of this invention are as follows.

EXAMPLE 1

Ten kilograms of $UO_2$ powder and a solution of 1½% ethylene diamine in 0.4% water, both on a $UO_2$ weight basis, were blended for 20 minutes in a 1 cubic foot Sweco vibratory mill containing ¾″ aluminum cylinders as media. Carbon dioxide gas was then introduced into the mill at a rate of 1 cubic foot per minute while the mill operated for an additional 30 minutes. ($H_2O$ added to reduce corrosive attack on particular material used to line vibratory mill is not necessary for all materials.)

The foregoing procedure was then repeated except 1 cubic foot of nitrogen gas was substituted in place of the carbon dioxide gas.

Compacts were then die pressed from the source $UO_2$ powder (not treatment), the carbon dioxide treated, and the nitrogen treated $UO_2$ powder. These compacts were then tested in diametral compression which allows a measure of tensile strength (TS), total elongation $E_{Total}$, plastic elonglation $E_P$, and $F^3$ which is a measure of crack blunting after failure has occurred.

|  | TS | $E_{Total}$ | $E_P$ | $F_3$ |
|---|---|---|---|---|
| Source $UO_2$ powder | 22 psi | 22μ | 4 | 0 |
| $UO_2$ + ethyene diamine + $H_2O$ + $CO_2$ | 52 | 68 | 39 | 3.5 |
| $UO_2$ + ethylene diamine + $H_2O$ + $N_2$ | 20 | 39 | 18 | 0.5 |

The $UO_2$ + ethylene diamine, and $CO_2$ obviously functions well as a binder by increasing tensile strength, total elongation, plastic elongation, and elongation after failure.

EXAMPLE 2

Twenty-one kilograms of $UO_2$ powder and a solution of 0.6% of ethylene diamine in 0.8% water, both on a $UO_2$ weight basis, well blended in a 3 cubic foot Sweco vibratory mill containing ¾″ aluminum cylinders. ($H_2O$ added to reduce corrosive attack on vibratory mill lining.) 0.7% ammonium oxalate was also added as a pore former for creating voids in the sintered pellets which will be fabricated from the powder. The mill operated 5 minutes to blend the ethylene diamine in water solution and ammonium oxalate. Carbon dioxide gas was then introduced into the mill at 6 cubic feet per minute with the mill running. The carbon dioxide gas treatment was then followed by 20 minutes of mill operation with 20 cubic feet of nitrogen flowing which by previous testing should evaporate the final water content to less than 5000 ppm. Diametral tests on compacts made from the powder revealed less than desired plasticity. The powder which was still in the mill was given an additional 6 cfm carbon dioxide flow for 10 minutes with the mill running. Diametral compression testing yielded the following properties:

| Tensile Strength | 67 psi |
|---|---|
| Total Elongation | 77μ |
| Plastic Elongation | 43μ |
| $F^3$ | 20μ |

The source (no additive) $UO_2$ diametral compression test results from example 1 may be used for comparison in establishing the performance of this binder.

EXAMPLE 3

Two hundred fifty grams of uranium dioxide along with two hundred grams of ½″ aluminum grinding media were introduced into an 8 ounce polyethylene bottle. 2.5% ethylene diamine was then added (6.25 grams) and the bottle placed on a paint shaker for 15 minutes. The aluminum balls were then screened from the blended powder which was next placed in a 6″ fritted glass porous funnel. 400 cfh of carbon dioxide gas was then flowed upward through the powder creating the binder. Diametral compression at various time intervals of carbon dioxide treatment are as follows:

|  | Tensile Strength | Total Elongation | Plastic Elongation | $F^3$ |
|---|---|---|---|---|
| 15 min $CO_2$ | 106 psi | 115μ | 70μ | 48μ |
| 30 min $CO_2$ | 154 psi | 144μ | — | 21μ |
| 45 min $CO_2$ | 177 psi | 166μ | — | 16μ |
| 60 min $CO_2$ | 240 psi | 106μ | 46″ | 3μ |

No water used in this example.

What is claimed is:

1. A method of producing coherent compacts of particulate ceramic nuclear fuel material whereby the ceramic material is rendered more plastic and amenable to processing, consisting essentially of the sequence of steps of:
   (a) adding a fugitive binder consisting essentially of at least one amine selected from the group consisting of ethylene diamine, 3.3 diaminodipropylamine, 1.3 diaminopropane, 1.6 diaminohexane, 1.7 diaminoheptane, diethylenetriamine, and 3-dimethylaminopropylamine to particulate nuclear fuel material of uranium dioxide and blending the binder therethrough;
   (b) thereafter introducing carbon dioxide gas into the blend of particulate fuel material and amine binder; and
   (c) pressing the resultant blend comprising particulate fuel material and amine binder having had the carbon dioxide gas introduced therein into a coherent compact.

2. The method of claim 1, wherein the fugitive binder is a water solution of the amine.

3. The method of claim 1, wherein the fugitive binder comprises a multifunctional primary amine.

4. The method of claim 1, wherein the fugitive binder comprises ethylene diamine.

5. A method of producing coherent compacts of particulate ceramic nuclear fuel material whereby the ceramic material is rendered more plastic and amenable to processing, consisting essentially of the sequence of steps of:
   (a) adding a fugitive binder consisting essentially of at least one multifunctional primary amine selected from the group consisting of ethylene diamine, 3.3 diaminodipropylamine, 1.3 diaminopropane, 1.6 diaminohexane, 1.7 diaminoheptane, diethylenetriamine, and 3-dimethylaminopropylamine to particulate nuclear fuel material consisting of uranium dioxide and blending the binder therethrough;
   (b) thereafter introducing carbon dioxide gas into the blend of particulate fuel material and amine binder; and
   (c) pressing the resultant blend comprising particulate fuel material and amine binder having had the carbon dioxide gas introduced therein into a coherent compact.

6. The method of claim 5, wherein the fugitive binder is a water solution of the multifunctional primary amine.

7. The method of claim 5, wherein the fugitive binder comprises ethylene diamine.

8. The method of claim 5 wherein multifunctional primary amine is added to the particulate nuclear fuel material in amount of about 0.3 to about 4% by weight of the amine based upon the weight of the fuel material.

9. A method of producing coherent compacts of particulate ceramic nuclear fuel material whereby the ceramic material is rendered more plastic and amenable to processing, consisting essentially of the sequence of steps of:
   (a) adding a fugitive binder consisting essentially of ethylene diamine to particulate nuclear fuel material consisting of uranium dioxide and blending the binder therethrough;
   (b) thereafter introducing carbon dioxide gas into the blend comprising particulate fuel material and amine binder;
   (c) pressing the resultant blend comprising particulate nuclear fuel material and ethylene diamine having had the carbon dioxide gas introduced therein into a coherent compact; and
   (d) sintering the compact of the blend to expel binder material and integrate the particulate nuclear fuel material into a uniform body.

10. The method of claim 9 wherein the fugitive binder is a water solution of the multifunctional primary amine.

11. The method of claim 9, wherein the carbon dioxide gas is introduced in amount of at least one mole of carbon dioxide gas for each gram mole of $NH_2$ in the amine.

12. The method of claim 9, wherein multifunctional primary amine is added to the particulate nuclear fuel material in amount of about 0.3 to about 4% by weight of the amine based upon the weight of the fuel material.

13. A method of producing coherent compacts of particulate cdramic nuclear fuel material whereby the ceramic material is rendered more plastic and amenable to processing, consisting essentially of the sequence of steps of:
   (a) adding a fugitive binder consisting essentially of at least one amine selected from the group consisting of ethylene diamine, 3.3 diaminodipropylamine, 1.3 diaminopropane, 1.6 diaminohexane, diethylene triamine and 3-dimethylaminoproplyamine to particulate nuclear fuel material consisting of uranium dioxide in amount of about 0.5 to about 4% by weight of the amine based upon the weight of the fuel material and blending the binder thereof;
   (b) thereafter introducing carbon dioxide gas into the blend comprising particulate fuel material and amine binder in amount of at least one mole of carbon dioxide gas for each gram mole of $NH_2$ in the amine;
   (c) pressing the resultant blend comprising particulate nuclear fuel material and ethylene diamine having had the carbon dioxide gas introduced therein into a coherent compact; and
   (d) sintering the compact of the blend to expel binder material and integrate the particulate nuclear fuel material into a uniform body.

* * * * *